March 14, 1950     E. T. GRANT     2,500,748
MAGNETIC STRUCTURE

Filed Nov. 21, 1947

Inventor:
Eduard T. Grant,
by *[signature]*
His Attorney.

Patented Mar. 14, 1950

2,500,748

UNITED STATES PATENT OFFICE 2,500,748

MAGNETIC STRUCTURE

Eduard T. Grant, Scotia, N. Y., assignor to General Electric Company, a corporation of New York Application November 21, 1947, Serial No. 787,432

2 Claims. (Cl. 175—21)

My invention relates to magnetic structures, and more particularly to a method and means for joining together two or more magnetizable members to form a unitary magnetic structure.

It is a general object of my invention to provide a new and improved magnetic structure which is simple and inexpensive in manufacture, and durable and reliable in operation.

It is a further object of my invention to provide a new and reliable method of making magnetic structures having permanent and predictable characteristics.

It is a more specific object of my invention to provide a new and improved method and means for joining together two or more parts of a magnetic structure, while providing therebetween a permanent non-magnetic gap of fixed dimension.

In accordance with my invention, I provide a magnetic structure comprising a pair of magnetizable members having contiguous surfaces brazed together to form a joint. In forming the joint, I first position adjacent the contiguous surfaces a body of low melting point non-magnetizable brazing material, such as copper or the like. With the parts thus assembled, I braze the joint to form a unitary structure, the brazing operation introducing by capillary action a film of non-magnetizable material between the contiguous surfaces of the joint, thereby to form a permanent non-magnetic gap of fixed dimension in the magnetic structure.

Figure 1:
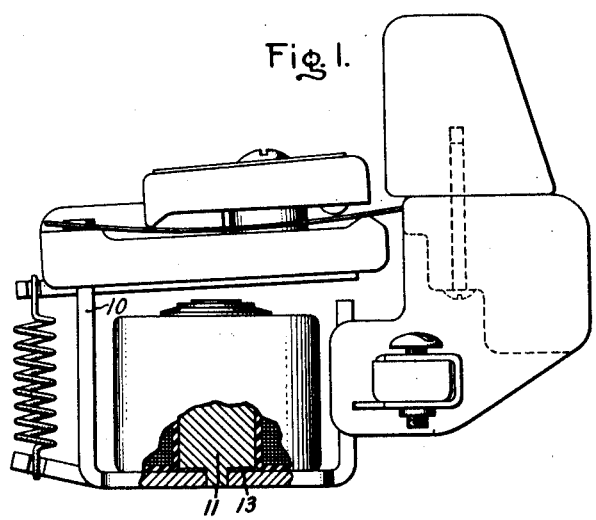
Figure 2:
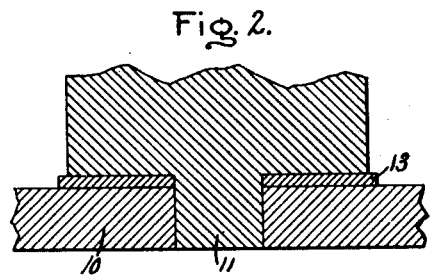
Figure 3:
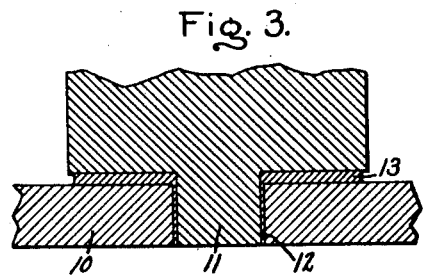

My invention will be more fully understood and its various objects and advantages further appreciated by referring now to the following detailed specification taken in conjunction with the accompanying drawing, in which Fig. 1 is a side view, partly in section, of an electromagnetic relay embodying my invention, and Figs. 2 and 3 are enlarged cross sectional views showing successive steps in the formation of a brazed joint between the two magnetizable frame members of the relay.

Referring now to the drawing, and particularly to Fig. 1, the electromagnetic relay there shown by way of illustration of my invention, comprises a U-shaped magnetizable frame member 10 having mounted thereon a center leg, or coil core, 11. The core 11 is attached to the bight portion of the U-shaped frame 10 by a mortise and tenon joint having a thin film 12 of non-magnetizable brazing material, such as copper, or the like, interposed between contiguous surfaces of the mortise and the tenon. This brazed joint is shown in greater detail at Fig. 3. This joint is formed by brazing together the jointed portions of the magnetizable frame with copper or other suitable brazing material, in the manner described in greater detail below.

In forming the joint illustrated at Figs. 2 and 3, the magnetizable frame member 10 is mortised to form a tight press fit with the tenon on the member 11. In assembling the members 10 and 11, a thin washer 13 of copper, or other suitable non-magnetizable brazing material is first slipped over the tenon on the member 11 and seated against the shoulder at the base of the tenon. The tenon is then pressed into the mortise member with the non-magnetic washer 13 therebetween. In this assembled position, and prior to the brazing operation, the joint appears as illustrated at Fig. 2 of the drawing.

With the frame members pressed together as shown at Fig. 2 and with the copper washer 13 in position, the structure is heated utilizing the washer 13 as a brazing metal, thereby rigidly to fasten the parts together at the joint. In the brazing operation, the washer 13 is raised to its melting point, and by capillary action a portion of the washer 13 flows along the contiguous surfaces of the mortise and the tenon, as indicated at 12, Fig. 3. This film 12 of brazing material wets the surfaces of the tenon and the mortised member and flows between these surfaces, so that there is no iron-to-iron contact upon completion of the brazing operation. The thin film and sleeve of non-magnetizable material provides a permanent non-magnetic gap of fixed dimension, and serves also to braze the parts rigidly together in the desired position.

In the completed magnetic structure comprising the core 11 and the frame 10, the washer 13, of course, also forms a non-magnetic gap of fixed dimension, since not all the magnetic flux passes through the tenon. In such a structure, the residual magnetic characteristic of the structure depends, in part, upon the relative cross sectional areas of the core and tenon. As the tenon is made larger relative to the core, the residual magnetism increases, for a greater proportion of the flux passes through the tenon and the small capillary gap, so that the net effective gap is less.

While I have shown and described only a preferred embodiment of my invention, by way of illustration, various modifications will occur to those skilled in the art and I, therefore, wish to have it understood that I intend in the appended claims to cover all such modifications as fall within the true spirit and scope of my invention.

What I claim as new and desire to secure by Letters Patent of the United States, is:

1. In a magnetic structure, a pair of magnetizable members having a mortise and tenon joint therebetween, a washer of non-magnetizable material brazed between said members adjacent said joint, and a capillary film of said non-magnetizable material brazed between contiguous surfaces of said joint.

2. In a magnetic structure, a first magnetizable member provided with a mortise, a second magnetizable member having a projection thereon forming a tenon, said two magnetizable members being interfitted to form a mortise and tenon joint, a washer of low melting point non-magnetizable material brazed between said members adjacent said joint, and a capillary film of said non-magnetizable material brazed between contiguous surfaces of said mortise and tenon, thereby rigidly to connect said magnetizable members together and to form therebetween a permanent non-magnetic gap of fixed dimensions.

EDUARD T. GRANT.

REFERENCES CITED

The following references are of record in the file of this patent:

UNITED STATES PATENTS

| Number | Name | Date |
|---|---|---|
| 1,180,457 | Walker | Apr. 25, 1916 |
| 1,339,553 | Dunbar | May 11, 1920 |

FOREIGN PATENTS

| Number | Country | Date |
|---|---|---|
| 559,526 | Great Britain | Feb. 23, 1944 |

OTHER REFERENCES

Sil-Fos and Easy-Flo, Bulletin 12a, Handy & Harmon.